United States Patent

[11] 3,522,758

[72] Inventors: Italo Minelli  
Kempthalstrasse 56, Pfaffikon, Switzerland;  
Paul Ramseier, Usterstrasse 55, Pfaffikon, Switzerland
[21] Appl. No.: 706,958
[22] Filed: Feb. 20, 1968
[45] Patented: Aug. 4, 1970
[32] Priority: March 1, 1967
[33] Switzerland
[31] No. 2963/67

[54] TURNING HEAD FOR CUTTING VALVE SEATS OF INTERNAL-COMBUSTION ENGINES  
3 Claims, 3 Drawing Figs.

[52] U.S. Cl. .............................................. 90/12.5, 51/241
[51] Int. Cl. .................................................. B23c 1/20, B24b 19/00
[50] Field of Search .......................................... 90/12.5; 77/2, 13; 51/241.1, 241.12

[56] References Cited
UNITED STATES PATENTS

| | | | |
|---|---|---|---|
| 2,026,821 | 1/1936 | Cleveland et al. | 90/12.5 |
| 2,820,377 | 1/1958 | Buck | 77/13X |

FOREIGN PATENTS

| | | | |
|---|---|---|---|
| 537,262 | 2/1922 | France | |
| 588,943 | 6/1947 | Great Britain | |
| 1,220,437 | 5/1960 | France | |

*Primary Examiner—* Gil Weidenfeld  
*Attorney—* Robert H. Jacob

ABSTRACT: A form tool for cutting the valve seat is mounted on a spindle rotatable in a ball joint that is clampable in a holder which can be clamped in any desired position to a column. The spindle is adjustably spring loaded and can be positioned vertically. A pilot spindle projects into the valve-stem guide.

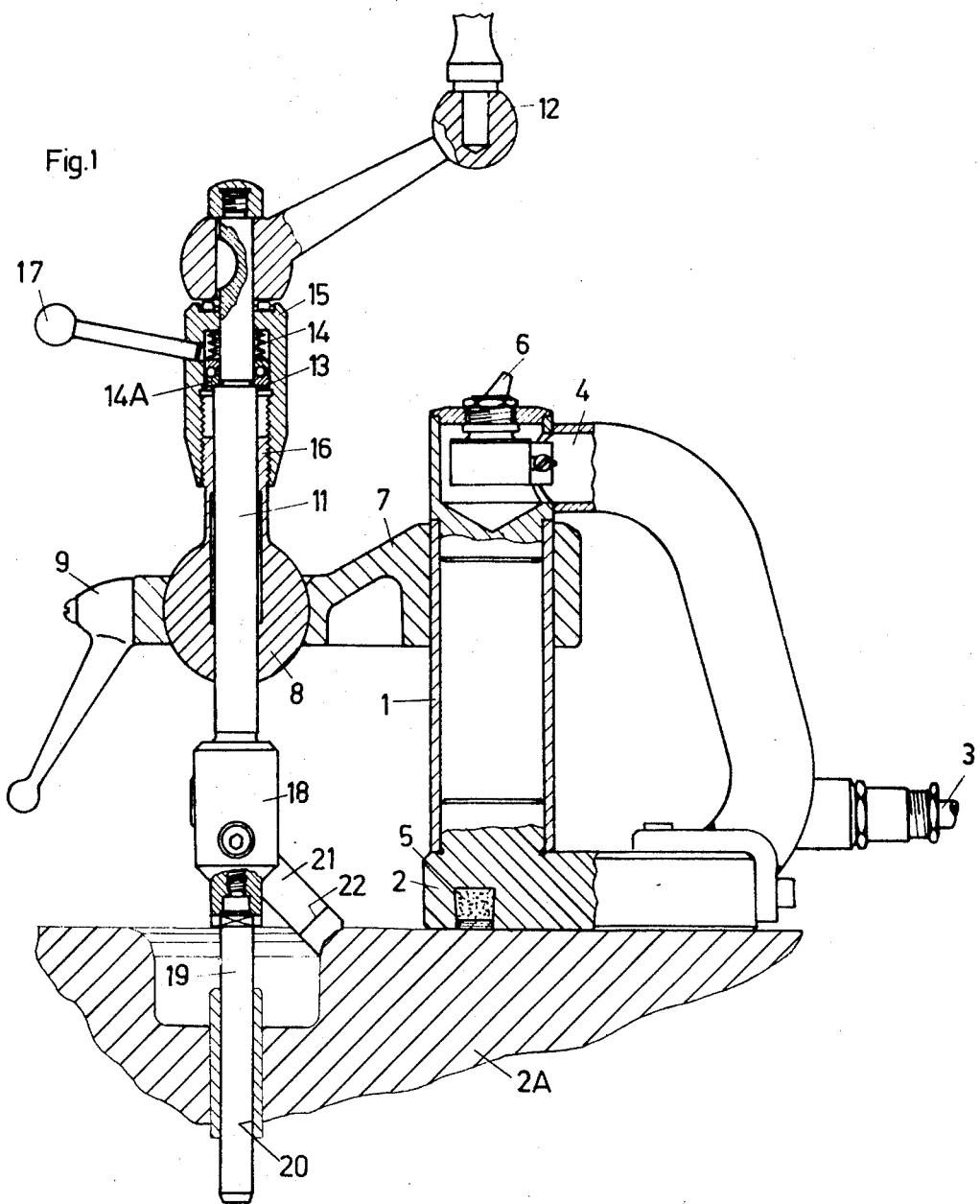

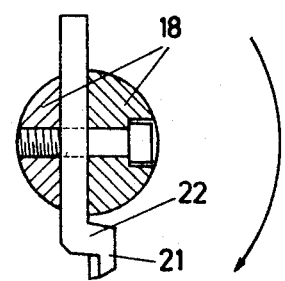
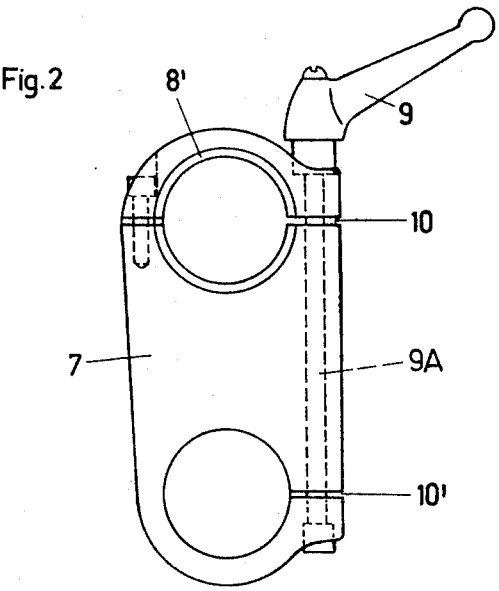

U.S. PATENT 3,522,758
TURNING HEAD FOR CUTTING VALVE SEATS OF INTERNAL-COMBUSTION ENGINES

BACKGROUND OF THE INVENTION

The invention relates to a device for cutting the valve seats of internal-combustion engines.

There has long been a need for a simple device that precisely and quickly cuts valve seats without the need for highly skilled labor.

SUMMARY OF THE INVENTION

The turning head of the invention fulfills this need.

An object of the invention is a device for cutting valve seats of internal-combustion engines that is simply and robustly constructed and which quickly produces precision valve seats.

This object, as well as other objects, of the invention will be apparent from the ensuing detailed description.

BRIEF DESCRIPTION OF THE DRAWINGS

The invention will be described with reference to the figures of the accompanying drawings, wherein:

FIG. 1 is a side view partly cut away;
FIG. 2 is a top view of the holder; and
FIG. 3 is a top view in section taken through the tool holder.

DESCRIPTION OF THE PREFERRED EMBODIMENT

With reference to the Figures, the turning head of the invention includes a column 1 held in a mounting base 2. Housed within the base is an electromagnet 5 connected via a cord 3 to the power line, whereby the base is held in position on a support 2A, such as the cylinder block of an internal-combustion engine, by magnetic attraction. The current to the electromagnet is turned on and off by a switch 6. The member 4 serves as a handgrip and also to secure the column 1. A holder 7 defining a first clamp at one end mounted on the column can be pivoted about and moved along the latter. The holder defines a second clamp at its other end which incorporates a seat 8'(FIG. 2) for a ball 8 to form a ball joint. A handle 9 for turning a clamping screw 9A is operative to clamp the first clamp of the holder 7 to the column 1 and simultaneously to clamp the second clamp forming the ball joint and the parts held thereby in position, the holder being provided with two suitably located slots 10 and 10' to permit the clamping.

The ball joint 8 and 8' serves to guide the spindle 11, which embodies an upper end of reduced diameter. To this end a handle 12 for turning the spindle, which is free to move axially, as well as to rotate in the ball joint is rigidly connected. A spring 14, housed within a cap 15, and compressed between the underside thereof and a ball-bearing 14A, bears through the ball-bearing on a shoulder 13 formed where the spindle 11 thickens. The cap 15 is screwed onto a threaded extension 16 of the ball 8. The thrust and spring tension are regulated by turning the cap by means of a handle 17. The cap 15 can be screwed down until the hidden end of the handle 17 lies opposite the ball-bearing 14A.

The spindle 11 carries at its lower end a tool holder 18 and a pilot spindle 19, the outer diameter of which latter is exactly equal to the inner diameter of the valve-stem guide 20.

The form tool 21 is removably mounted on the tool holder in any suitable and known manner and projects therefrom so as to form a suitable included angle, such as 45°, with the spindle 11. The form tool is off set at 22 and the cutting edge has a profile which corresponds to that of the valve seat.

The manner in which the invention is used is apparent from the foregoing description. The turning head is set on the cylinder block 2A and the pilot spindle 19 inserted into the valve-stem guide. The parts of the turning head are then clamped in the desired positions by the handle 9, and the valve seat cut by slowly screwing down the cap 15 and simultaneously turning the handle 12.

The mounting base 2 can be held by the electromagnet to the cylinder block only when the latter is made of a magnetizable metal. Where this is not the case, a magnetizable support is employed for the cylinder heads, and the base magnetically fixed to this support.

We claim:

1. A turning head for cutting valve seats of internal-combustion engines, including an upright support means, a holder means having a first clamp at one end mounted on said support means free to pivot thereon and to move therealong, means for adjusting and tightening said holder means on said support means in a desired position, said holder means defining a second clamp at its other end, a first spindle means, pivotal means for mounting said first spindle means on the second clamp of said holder means free to turn about and to move along its own axis, means for fixing said pivotal means in a desired position, a second spindle means for insertion in the valve-stem guide, a cutting tool means mounted at the lower end of said first spindle means, means for turning said first spindle means and means for adjusting the axial position thereof located at the upper end of said first spindle means, said pivotal means being a ball joint, and said means for adjusting and tightening said holder means on said support means simultaneously tightening and loosening the grip thereof on said ball joint.

2. The turning head as defined in claim 1, wherein said means for adjusting and tightening includes a clamping screw and a handle for turning said screw.

3. The turning head as defined in claim 1, wherein said cutting tool means includes a form tool having an offset portion incorporating a cutting edge.